US008932847B2

(12) United States Patent
Cantwell et al.

(10) Patent No.: US 8,932,847 B2
(45) Date of Patent: *Jan. 13, 2015

(54) MICROBIAL PRODUCTION OF NITROUS OXIDE COUPLED WITH CHEMICAL REACTION OF GASEOUS NITROUS OXIDE (75) Inventors: Brian J. Cantwell, Palo Alto, CA (US); Craig S. Criddle, Redwood City, CA (US); Kevin Lohner, Saratoga, CA (US); Yaniv D. Scherson, Menlo Park, CA (US); George F. Wells, Evanston, IL (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 752 days.

This patent is subject to a terminal disclaimer.

(21) Appl. No.: 12/799,677

(22) Filed: Apr. 28, 2010

(65) Prior Publication Data

US 2010/0272626 A1    Oct. 28, 2010

Related U.S. Application Data (60) Provisional application No. 61/214,892, filed on Apr. 28, 2009, provisional application No. 61/328,431, filed on Apr. 27, 2010.

(51) Int. Cl.
*C01B 21/22* (2006.01)
*C01B 21/00* (2006.01)
*C01B 21/02* (2006.01)
*C02F 3/30* (2006.01)
*C01B 13/02* (2006.01)
*C02F 3/34* (2006.01)
*C02F 3/12* (2006.01)
*C02F 101/16* (2006.01)
*C02F 103/06* (2006.01)
*C02F 103/26* (2006.01)
*C02F 103/36* (2006.01)

(52) U.S. Cl.
CPC . *C01B 21/02* (2013.01); *C02F 3/30* (2013.01); *C01B 13/0203* (2013.01); *C01B 21/22* (2013.01); *C02F 3/302* (2013.01); *C02F 3/34* (2013.01); *C02F 3/1263* (2013.01); *C02F 2101/16* (2013.01); *C02F 2103/06* (2013.01); *C02F 2103/26* (2013.01); *C02F 2103/365* (2013.01); *C02F 2209/02* (2013.01); *C02F 2209/06* (2013.01); *C02F 2209/34* (2013.01)
USPC ........ 435/266; 435/168; 423/239.1; 423/351; 423/358; 423/400

(58) Field of Classification Search
CPC .... C01B 13/0203; C01B 21/02; C01B 21/22; C02F 3/302; C02F 3/34; C02F 3/1263; C02F 2209/34; C02F 2103/06; C02F 2103/26; C02F 2103/365; C02F 2209/02; C02F 2209/06; C02F 2101/16

USPC .......................... 423/402, 423, 400; 435/266
See application file for complete search history.

(56) References Cited

U.S. PATENT DOCUMENTS

| 5,820,760 | A |   | 10/1998 | Spector |  |
|---|---|---|---|---|---|
| 5,967,099 | A | * | 10/1999 | Patrick | 123/1 A |
| 6,383,390 | B1 |   | 5/2002 | Van Loosdrecht et al. |  |
| 6,485,646 | B1 |   | 11/2002 | Dijkman et al. |  |
| 6,846,471 | B2 |   | 1/2005 | Hotta et al. |  |
| 7,211,232 | B1 | * | 5/2007 | Zuberi | 423/210 |
| 2002/0092290 | A1 |   | 7/2002 | Herdy |  |
| 2005/0218074 | A1 | * | 10/2005 | Pollock | 210/637 |

OTHER PUBLICATIONS

Lashof DA and Ahuja DR (1990). Relative contributions of greenhouse gas emissions to global warming. Nature, v344, p. 529-531.*
Tallec G et al. (2006). Nitrous oxide emissions from secondary activated sludge in nitrifying conditions of urban wastewater treatment plants: Effect of oxygenation level. Water Research, v40, p. 2972-2980.*
Moran JE et al. (2008) Development of a Field Deployable Gas Extraction Apparatus. UCRL-TR-407175, 24pp.*
Zhan et al. (2008 Epub). Nitrogen removal from slaughterhouse wastewater in a sequencing batch reactor under controlled low DO conditions. Bioprocess Biosyst Eng., v32(5): p. 607-614.*
CA Dept. of Energy (2003). "Cogeneration Optimization."*
Lemaire et al. (2006). Identifying causes for N2O accumulation in a lab-scale sequencing batch reactor performing simultaneous nitrification, denitrification and phosphorus removal. Journal of Biotechnology, v122, p. 62-72.*
NACWA (Oct. 1, 2009). "Renewable Energy Recovery Opportunities from Domestic Wastewater," 3 pages.*
WERF (Mar. 2009). "Energy Opportunities in Wastewater and Biosolids," 2 pages.*
R. Zeng, Z. Yuan, J. Keller, Enrichment of Denitrifying Glycogen-Accumulating Organisms in Anaerobic/Anoxic Activated Sludge System, Biotechnology and Bioengineering vol. 81, Issue 4, pp. 397-404, Feb. 20, 2003.

(Continued)

*Primary Examiner* — Cherie M Stanfield
*Assistant Examiner* — Sean C Barron
(74) *Attorney, Agent, or Firm* — Lumen Patent Firm (57) ABSTRACT A bioreactor designed to produce $N_2O$ from organic nitrogen and/or reactive nitrogen in waste is coupled to a hardware reactor device in which the $N_2O$ is consumed in a gas phase chemical reaction, e.g., catalytic decomposition to form oxygen and nitrogen gas. Heat from the exothermic reaction may be used to generate power. The bioreactor may use communities of autotrophic microorganisms such as those capable of nitrifier denitrification, ammonia oxidizing bacteria, and/or ammonia oxidizing archaea. A portion of the $N_2O$ dissolved in aqueous effluent from the bioreactor may be separated to increase the amount of gas phase $N_2O$ product. The amount of the gas phase $N_2O$ in a gas stream may also be concentrated prior to undergoing the chemical reaction. The $N_2O$ may alternatively be used as an oxidant or co-oxidant in a combustion reaction, e.g., in the combustion of methane.

20 Claims, 5 Drawing Sheets

(56) References Cited

OTHER PUBLICATIONS

S. Schalk-Otte, R. J. Seviour, J. G. Kuenen and M. S. M. Jetten, Nitrous Oxide (N2O) Production by *Alcaligenes faecalis* During Feast and Famine Regimes, Wat. Res. vol. 34, No. 7, pp. 2080-2088, 2000, Elsevier Science.

J. T. Moraghan and R. J. Buresh, Chemical Reduction of Nitrite and Nitrous Oxide by Ferrous Iron, Soil Sci. Soc, Am. J., vol. 41, 1977.

J. Sorensen and L. Thorling, Stimulation by lepidocrocite (gamma-FeOOH) of Fe(II)-dependent nitrite reduction, Geochimica et Cosmochimica Acta, vol. 55 (1991), pp. 1289-1294.

C. Hellinga, A. A. J. C. Schellen, J. W. Mulder, M. C. M. van Loosdrecht, J. J. Heijnen, The SHARON Process: An Innovative Method for Nitrogen Removal from Ammonium-Rich Waste Water, Water Science and Technology, vol. 37, Issue 9, 1998, pp. 135-142.

H. C. B. Hansen, O. K. Borggaard, J. Sorensen, Evaluation of the Free Energy of Formation of Fe(ii)-Fe(III) hydroxide-sulphate (green rust) and its reduction of nitrite, Geochimica et Cosmochimica Acta, vol. 58 (1994), No. 12, pp. 2599-2608.

V. A. Samarkin, M. T. Madigan, M. W. Bowles, K. L. Casciotti, J. C. Priscu, C. P. McKay, and S. B. Joye, Abiotic nitrous oxide emission from the hypersaline Don Juan Pond in Antarctica, Nature Geoscience, vol. 3, Apr. 25, 2010.

S. Rakshit, C. J. Matocha, M. S. Coyne, Nitrite Reduction by Siderite, Soil Sci. Soc. Am. J. vol. 72, No. 4, pp. 1070-1077, 2007.

R. L. Meyer, R. J. Zeng, V. Giugliano, L. L. Blackall, Challenges for simultaneous nitrification, denitrification, and phosphorus removal in microbial aggregates: mass transfer limitation and nitrous oxide production, FEMS Microbiology Ecology 52 (2005) 329-338.

* cited by examiner

MICROBIAL PRODUCTION OF NITROUS OXIDE COUPLED WITH CHEMICAL REACTION OF GASEOUS NITROUS OXIDE

CROSS-REFERENCE TO RELATED APPLICATIONS

This application claims priority from U.S. Provisional Patent Application 61/214,892 filed Apr. 28, 2009 and to U.S. Provisional Patent Application 61/328,431 filed Apr. 27, 2010, both of which are incorporated herein by reference.

FIELD OF THE INVENTION

This invention relates generally to devices and methods for removing nitrogen compounds from waste using bioreactors. More specifically, it relates to coupling bioreactors to hardware devices that react nitrous oxide from the bioreactors.

BACKGROUND

With a global warming potential (GWP) 310 times greater than $CO_2$, $N_2O$ is an extremely potent greenhouse gas (GHG). Models of various emission scenarios worldwide published by the IPCC have suggested a steady increase in $N_2O$ production through the 21st century. The impact of such great levels of $N_2O$ would result in a significant increase in atmospheric heat retention.

In addition to $N_2O$, other forms of reactive nitrogen also pose a great threat to the environment. Human alteration of the nitrogen cycle via the Haber process, intensive crop cultivation, and fossil fuel use has approximately doubled the rate of nitrogen input to the terrestrial nitrogen cycle. Loss of this anthropogenic nitrogen to natural systems has led to an array of environmental and public health problems, including ammonia toxicity to aquatic life, eutrophication of nutrient limited natural water bodies, oxygen depletion, and vast dead zones in the ocean margins. It is thus apparent that approaches to $N_2O$ mitigation must be accompanied by strategies to control reactive nitrogen to natural environments.

The traditional objective of wastewater treatment is to achieve complete conversion of nitrogen compounds in waste to $N_2$ gas. This is accomplished by oxidizing the nitrogen to nitrate then reducing the nitrate to $N_2$. $N_2O$ gas is not deliberately produced, but is often incidentally generated at levels that are low but still problematic for greenhouse gas emissions. Due to its negative environmental effects, researchers have never attempted to maximize $N_2O$ production rates. To the contrary, researchers have instead focused on minimizing or eliminating $N_2O$ production in these processes.

Domestic wastewater contains organics and reduced forms of nitrogen (organic N and ammonia) present as soluble and particulate forms and at relatively low concentrations. For the biodegradable organic matter, energy is often recovered as methane using anaerobic consortia of bacteria and archaea. These microorganisms oxidize waste organics, releasing the electrons and hydrogen as methane gas. Bioreactors designed for methane fermentation are common throughout the world, with applications that range in scale from simple low-rate household systems to sophisticated high rate industrial processes. The majority of these anaerobic bioreactors are "digesters", because they have as a major design objective the reduction and stabilization of biomass for disposal.

Figure 3A:
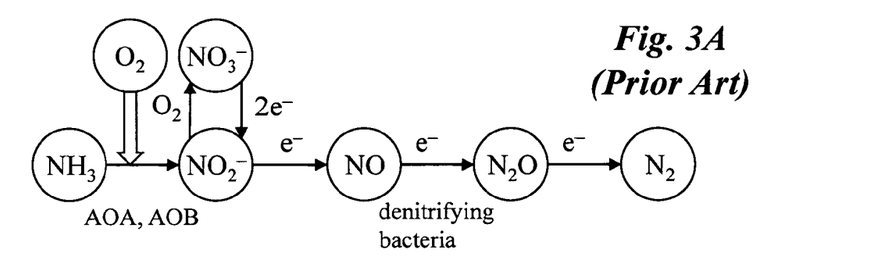
FIG. 3A is a schematic illustration of a conventional technique for microbially processing nitrogen.

Bioreactors are also used for nitrogen removal. Their function is to accelerate different steps in the nitrogen cycle, so as to prevent the harmful effects of N discharge: ammonia toxicity to fish, eutrophication, nitrate harm to infants, and dissolved oxygen depletion. In conventional systems, nitrogen is processed as shown in FIG. 3A. Ammonia is oxidized to nitrate, a two-step process termed nitrification that requires 2 moles of $O_2$ per mole of N. This oxygen is added by aeration, a process that constitutes about half of the operating expense of a wastewater treatment plant. The rate-limiting step in nitrification, the oxidation of ammonia to nitrite, is catalyzed by two distinct groups of microbes—the ammonia-oxidizing bacteria (AOB) and the newly discovered ammonia-oxidizing archaea (AOA). Most nitrite is then oxidized to nitrate by several distinct groups of nitrite-oxidizing bacteria (NOB), but under some conditions, particularly under low $O_2$ concentrations, AOB (and possibly AOA) emit $N_2O$ in a nitrite reduction process termed nitrifier-denitrification. Nitrate nitrogen resulting from nitrite oxidation may then be denitrified to $N_2$, a step requiring 5 moles of electrons per mole of N. In conventional systems, the electrons needed for denitrification come from organic matter, decreasing the number of electrons that can be routed to methane production. Denitrification also results in the production of large quantities of waste microbial biomass for disposal.

Figure 3B:
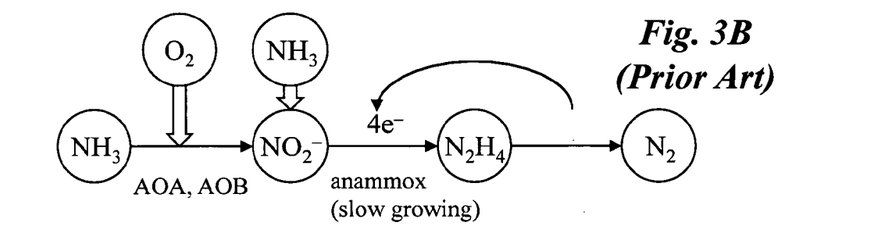
FIG. 3B is a schematic illustration of a more recent known technique for microbially processing nitrogen.

Over the last decade, innovations in N removal (i.e., the SHARON, OLAND, use of anammox bacteria, CANON processes) have occurred in European labs. These innovations exploit new understanding of microbial ecology so as to "short-circuit" the nitrogen cycle. The result is a significant decrease in the requirements for $O_2$ and reducing power. An example is the CANON process (Completely Autotrophic Nitrification Over Nitrite) illustrated in FIG. 3B. In this process, partial oxidation of ammonium to nitrite by AOB under bioreactor conditions that select against NOB is coupled to the anaerobic oxidation of ammonium to $N_2$ by anammox bacteria. The anammox bacteria convert nitrite and ammonium to $N_2$ gas through a hydrazine intermediate that apparently avoids $N_2O$ production. In principle, this process can achieve a 62% decrease in oxygen and a 90% savings in reducing power, but it is handicapped by the slow growth rates of the anammox bacteria, with doubling times on the order of 10-12 days. Other such innovations can dramatically alter the energy budget for wastewater treatment both by decreasing the energy invested for aeration and increasing the energy recovered as methane. As yet, however, no method of nitrogen removal enables direct energy extraction from the waste nitrogen itself.

SUMMARY OF THE INVENTION

In contrast with conventional wastewater treatment systems designed to avoid or at least minimize $N_2O$ production, the present invention couples a bioreactor to a hardware converter device in which the $N_2O$ is consumed in a gas phase chemical reaction. Surprisingly, it is desirable for the bioreactor to have higher, rather than lower, $N_2O$ production. Thus, in one aspect, a method is provided in which nitrogen compounds from waste are processed in a bioreactor system to produce nitrous oxide. In a hardware device coupled to the bioreactor system the nitrous oxide is then chemically reacted in gas phase. For example, the gaseous nitrous oxide may be chemically decomposed to form oxygen and nitrogen gas, or the gaseous nitrous oxide may be an oxidant in a combustion reaction. One of the most striking features of the $N_2O$ decomposition reaction is the fact that the product of the reaction is a mixture of ⅓ oxygen and ⅔ nitrogen—enriched air—plus energy. It is therefore a perfect producer of clean energy.

The nitrogen compounds processed by the bioreactor may include organic nitrogen and/or reactive nitrogen such as in wastewater. The method may be used, for example, as part of processing wastewater, agricultural waste, fertilized agricultural soil, or landfill leachates. The method may also be used, for example, as part of the biomass production of hydrocarbon fuels, diesel fuel, or ethanol.

The processing in the bioreactor system may include nitrification and partial denitrification, or nitrifier denitrification. The bioreactor may use communities of autotrophic microorganisms such as those capable of nitrifier denitrification, ammonia oxidizing bacteria, and/or ammonia oxidizing archaea. The bioreactor may also use communities of heterotrophic denitrifying microorganisms. The bioreactor system may have a single or multiple reaction stages. In some cases, a first stage of the bioreactor system is aerobic and a second stage of the bioreactor system is anoxic. In this case, the second stage of the bioreactor system may be aerated to a dissolved oxygen level below 20% oxygen saturation, or below 3% oxygen saturation, or the second stage of the bioreactor system may be anaerobic.

The nitrous oxide product from the bioreactor may be processed in various ways prior to chemically reacting in gas phase in the hardware device. For example, the method may include separating a portion of the nitrous oxide that is dissolved in aqueous effluent from the bioreactor to increase an amount of gas phase of the nitrous oxide product. The amount of the gas phase nitrous oxide in a gas stream may also be concentrated prior to undergoing the chemical reaction.

In the hardware device, the gaseous nitrous oxide may be decomposed in various ways such as catalytically, thermally by external heating, or through exothermic decomposition. Oxygen gas product from the nitrous oxide decomposition may be recycled back to the bioreactor system. In case the decomposition of the nitrous oxide is performed catalytically, the decomposition may be performed by flowing a gas stream containing the nitrous oxide through a chamber containing a catalyst, e.g., deposited on a catalyst support. The chamber may be made of a high temperature ceramic or high temperature alloy. The catalyst may be a metal or metal oxide, such as a transition metal or transition metal oxide. Catalysts include rhodium, rhodium oxide, iron, or iron oxide. Catalyst supports may include gamma phase aluminum oxide, zeolites, or a high surface area ceramic.

In some embodiments, the reaction may be used for energy generation, and the bioreactor may be designed to enhance or maximize the production of nitrous oxide. The nitrous oxide may also be used as an oxidant or co-oxidant in a combustion reaction, e.g., in the combustion of methane.

DETAILED DESCRIPTION

General Overview/Flowchart

Figure 1:
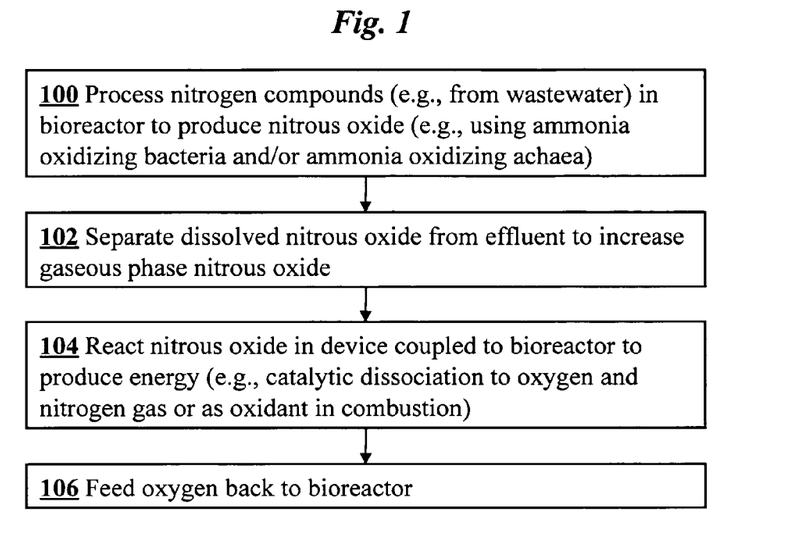
FIG. 1 is a flow diagram illustrating an overview of steps in a preferred embodiment of the invention.

An overview of a preferred embodiment of the invention is shown in the flowchart of FIG. 1. In step 100 nitrogen compounds from waste are processed in a bioreactor system to produce nitrous oxide. Optionally, in step 102 nitrous oxide product dissolved in effluent from the bioreactor is separated to increase the amount of gaseous phase nitrous oxide product. In step 104 the nitrous oxide is chemically reacted in gaseous phase using a hardware device coupled to the bioreactor system. In one configuration, the gaseous nitrous oxide is chemically decomposed to form oxygen and nitrogen gas. In this case, the oxygen may be optionally fed back to the bioreactor in step 106. Alternatively, the gaseous nitrous oxide may be an oxidant in a combustion reaction, in which case no oxygen is fed back.

Figure 2:
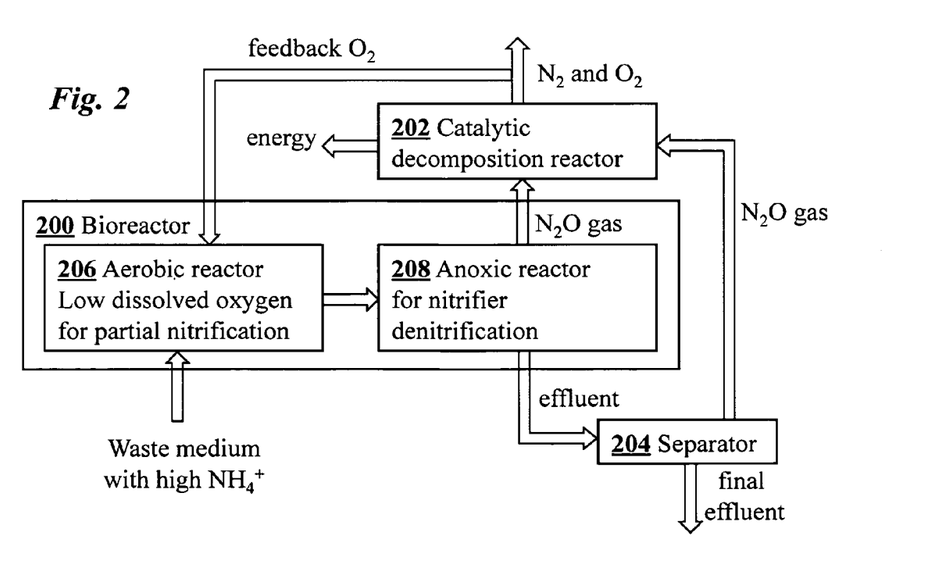
FIG. 2 is a schematic diagram of a coupled bioreactor-catalytic converter system according to one embodiment of the invention.

FIG. 2 is a schematic diagram of a coupled bioreactor-catalytic converter system according to one embodiment of the invention. The system converts waste nitrogen into $N_2O$ for thermal power generation and air for aeration, enabling a low-cost route for removal of soluble and reactive nitrogen species in wastewater, avoiding emissions of the powerful greenhouse gas $N_2O$, and producing oxygen that offsets part of the oxygen demand of waste treatment. The system includes a bioreactor 200 coupled to a catalytic converter device 202. Gas phase $N_2O$ product from the bioreactor 200 is fed to the converter 202. In addition, $N_2O$ dissolved in effluent from the bioreactor is passed through separator 204 to extract dissolved $N_2O$ to produce increased gas phase $N_2O$ which is sent to converter 202. In the converter 202 a catalytic decomposition of the $N_2O$ takes place, producing nitrogen gas and oxygen gas. The oxygen may be fed back to the bioreactor 200 for use in its aerobic stage. In addition, thermal energy from the decomposition reaction in converter 202 may be used for power generation.

Nitrogen Sources/Applications

The nitrogen compounds entering and processed by the bioreactor may include organic nitrogen and/or reactive nitrogen (e.g., ammonium), such as is commonly found in wastewater, agricultural waste, fertilized agricultural soil, or landfill leachates. The nitrogen compounds may also be derived from biomass production of hydrocarbon fuels, diesel fuel, or ethanol.

Bioreactor Design, Organisms, Stages, and Reactions

In preferred embodiments, the bioreactor system is designed to enhance or maximize the production of nitrous oxide. Bioreactors according to the present invention are different from conventional designs where the focus is always on designing systems that minimize $N_2O$ production and maximize $N_2$ production. In contrast, in embodiments of the present invention the production of $N_2O$ is an end point for nitrifier denitrification or heterotrophic denitrification rather than the production of $N_2$. This is advantageous because, unlike $N_2$, $N_2O$ can be thermally decomposed, releasing $O_2$ and heat.

The processing in the bioreactor system preferably includes nitrification and partial denitrification, or nitrifier denitrification. In one embodiment, the bioreactor is designed for nitrous oxide production by autotrophic nitrification-denitrification of ammonium at low levels of dissolved oxygen. The bioreactor system may have a single or multiple reaction stages. In the embodiment shown in FIG. 2, a first stage 206 of the bioreactor system is aerobic and a second stage 208 of the bioreactor system is anoxic. In various implementations, the second stage of the bioreactor system may be aerated to a dissolved oxygen level below 20% oxygen saturation, or below 3% oxygen saturation, or the second stage of the bioreactor system may be anaerobic.

Figure 3C:
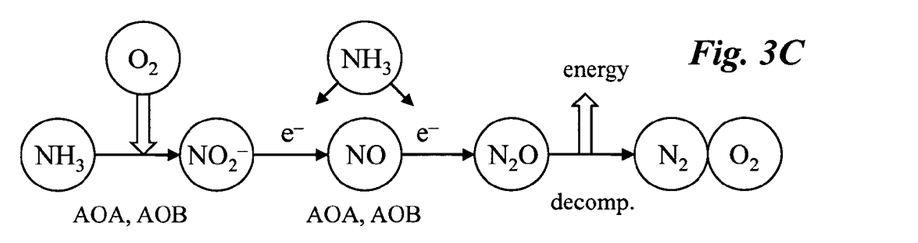
FIG. 3C is a schematic illustration of a technique for microbially processing nitrogen according to an embodiment of the present invention.
Figure 4:
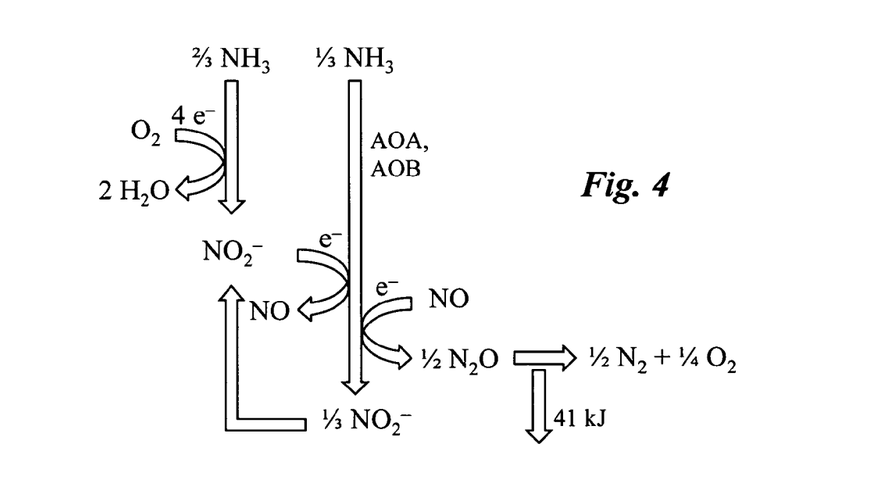
FIG. 4 shows energy reactions and organisms involved in aerobic nitrification-denitrification along with $N_2O$ decomposition according to one embodiment of the invention.

FIG. 4 shows the energy reactions and organisms involved in aerobic nitrification-denitrification along with $N_2O$ decomposition according to one embodiment. These pathways and organisms are preferably exploited in the bioreactor to maximize $N_2O$ production. The process is also shown in FIG. 3C. AOB enrichment cultures may be derived directly from a local wastewater treatment plant, and other enrichments of AOA and AOB, including other AOB known to produce $N_2O$ and also known to lack the gene needed for reduction of $N_2O$ to $N_2$ may be grown in both pure and mixed cultures in a lab-scale bioreactor system. An example of such an organism is the recently sequenced *Nitrosomonas europaea*. More generally, the bioreactor may use communities of autotrophic microorganisms such as those capable of nitrifier denitrification, ammonia oxidizing bacteria (AOB), and/or ammonia oxidizing archaea (AOA). In other embodiments, the bioreactor may use communities of heterotrophic denitrifying microorganisms either alone or together with communities of autotrophic microorganisms.

Multiple designs for the bioreactor system may be used, including a sequencing batch reactor and an attached growth fluidized bed reactor. In one embodiment, two dispersed growth chemostat reactors are operated in series and equipped for temperature and pH control. The first chemostat 206 is operated for partial nitrification (i.e., $NO_2^-$ generation), while the downstream reactor 208 is optimized for maximal $N_2O$ production via nitrifier-denitrification. Details of bioreactor design can be determined from a model of the bioreactor system that integrates reaction stoichiometry and energetics with chemostat mass balances and empirical kinetic coefficients.

For example, based on simulations performed with such a model, the first chemostat in the lab-scale system may initially be provided with high ammonium synthetic wastewater feed, representative of anaerobic digester supernatant or some industrial wastewaters. Low levels (~1 mg/L) of dissolved oxygen (DO) may be maintained in this reactor to select against NOB. $O_2$ delivery may be accomplished using pressurized $O_2$ delivered through hollow fiber membranes. Optimal removal of nitrogen in the second reactor may use a $NO_2^-$:$NH4^+$ ratio in the effluent from the first reactor of approximately 2. A short and tightly controlled residence time (~1.5 days) within the first reactor will enable selection for this ratio, based on the model. The downstream chemostat is operated anoxically, with a residence time of approximately 5 days, based on the model simulations, in order to maximize $N_2O$ production while selecting against slow growing anammox bacteria. Process variables to be evaluated for this type of bioreactor system include $NH4^+$ loading rate, temperature (20-35), pH (6-8), DO, and hydraulic residence time in each reactor. Monitoring of community structure may be performed using periodic clone libraries and routine monitoring of terminal restriction fragment length polymorphisms and abundance of the same genes using known methods. Levels of $NH4^+$ may be monitored with an $NH4^+$ probe, and nitrite by ion chromatography. Gas phase $N_2O$ production may be monitored using a gas displacement meter with offline analysis of gas composition on a GC-ECD.

Separation and Concentration of Nitrous Oxide

Figure 5A:
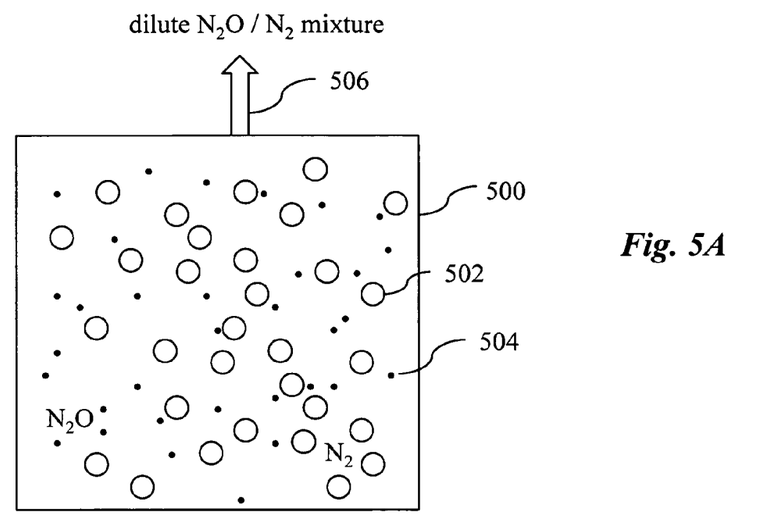
FIG. 5A is a schematic diagram of a gas stripping column for separating $N_2O$ dissolved in an effluent to produce gaseous $N_2O$ according to an embodiment of the invention.
Figure 5B:
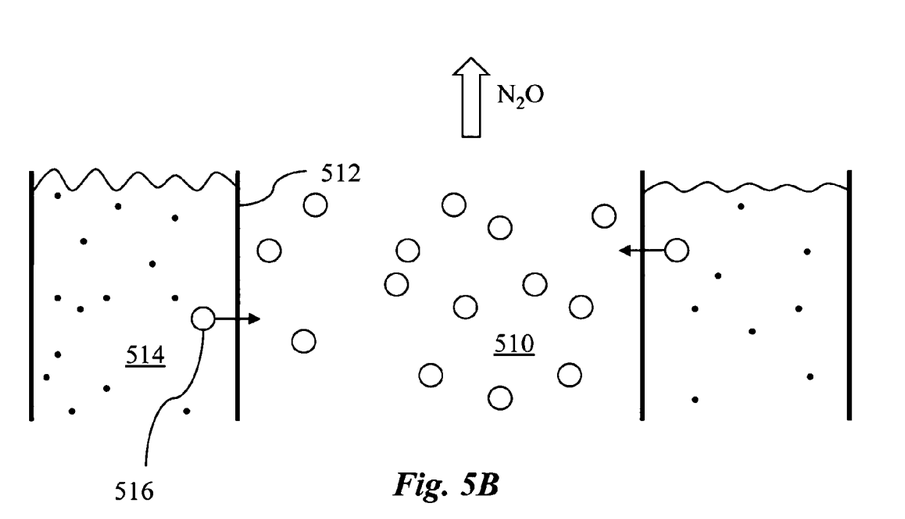
FIG. 5B is a schematic diagram of a gas separation device using pervaporation for separating $N_2O$ dissolved in an effluent to produce gaseous $N_2O$ according to an embodiment of the invention.

The nitrous oxide product from the bioreactor may be processed in various ways prior to chemically reacting in gas phase in the hardware device. Under the high influent $NH4^+$ levels in this type of bioreactor system, a high vapor pressure of $N_2O$ (50.8 atm at 20° C.) is expected to enable direct capture of $N_2O$ from the headspace of the second chemostat for decomposition and power generation. However, due to the relatively high solubility of $N_2O$ in water (1.08 g/l at 25° C. and 1 atm) it may be desirable to include a separation mechanism 204 to promote near-complete partitioning of dissolved $N_2O$ from the aqueous effluent to increase the portion of gas phase $N_2O$. Consequently, the method may include using a separator (204, FIG. 2) for separating a portion of the nitrous oxide that is dissolved in aqueous effluent from the bioreactor to increase an amount of gas phase of the nitrous oxide product to provide efficient mass transfer of biologically produced $N_2O$ from aqueous to a contained gas phase. Various techniques may be used to accomplish this end. For example, a small gas stripping column 500 may be used, as shown in FIG. 5A. In the column, $N_2$ carrier gas bubbles 502 are introduced to the solution containing dissolved $N_2O$ 504. The $N_2$ bubbles 502 strip the $N_2O$ 504 from the solution and the $N_2$/$N_2O$ gas mixture 506 may then be captured as the bubbles emerge from the top of the column. At 25° C., gas-phase $N_2O$ can be separated from $N_2$ carrier gas by a molecular sieve, and $N_2$ gas may be recycled back to form new bubbles at the bottom of the stripping column. Alternatively, a separator may be implemented using vacuum separation from the second chemostat reactor, as shown in cross-sectional view in FIG. 5B. A central column 510 with a vacuum is separated a permeable membrane 512 selective for $N_2O$ from an annular column 514 containing effluent with dissolved $N_2O$ 516. Through pervaporation, dissolved $N_2O$ is directly extracted from the effluent as it passes through the membrane 512 and into the central column 510.

Figure 6:
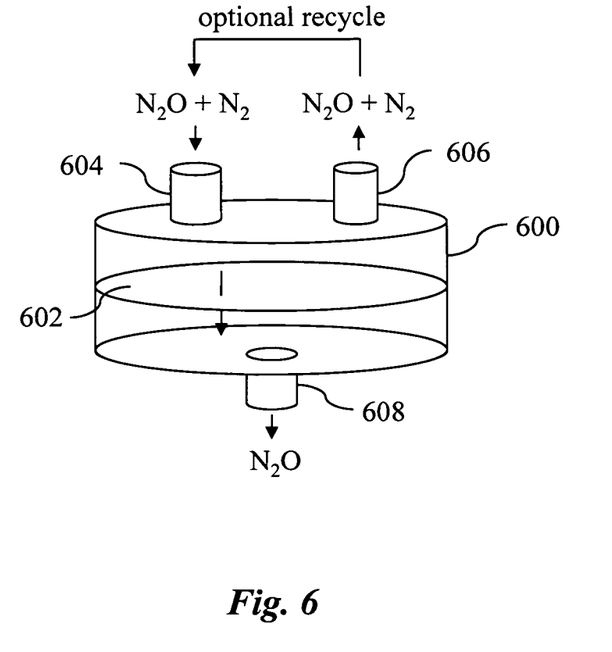
FIG. 6 is a schematic diagram of a device for concentrating $N_2O$ in a gas stream according to an embodiment of the invention.

In some embodiments, it may be desirable to concentrate the amount of the gas phase nitrous oxide in the gas stream prior to entering the chemical reactor. For example, FIG. 6 shows one possible implementation of a device for concentrating $N_2O$ in a gas stream. The device has a chamber 600 divided into upper and lower subchambers by a selective membrane 602. A mixture of $N_2O$ and $N_2$ enters the upper subchamber through a port 604 and exits through a port 606. $N_2O$ gas in the upper subchamber selectively passes through the membrane 602 into the lower subchamber and exits through port 608, producing a concentrated stream of $N_2O$ gas. The $N_2O$ can alternatively be concentrated using various other techniques.

Decomposition of Nitrous Oxide Gas

In a preferred embodiment, the gaseous nitrous oxide is decomposed to produce nitrogen gas and oxygen gas in the hardware reactor device designed to operate at the outlet conditions of the bioreactor. The decomposition may be performed in various ways such as catalytically, thermally by external heating, or through exothermic decomposition. This decomposition reaction, when combined with the $N_2O$ generating bioreactor system in embodiments of the invention, produce a new source of renewable energy and, since the product of the decomposition reaction is oxygen-enriched air, this energy is generated with zero production of greenhouse gas. Moreover, the $O_2$ product from the nitrous oxide decomposition can be recycled back to the bioreactor system, offsetting a significant fraction of the oxygen demand for the partial ammonia oxidation needed to produce $N_2O$ from ammonia.

Figure 7:
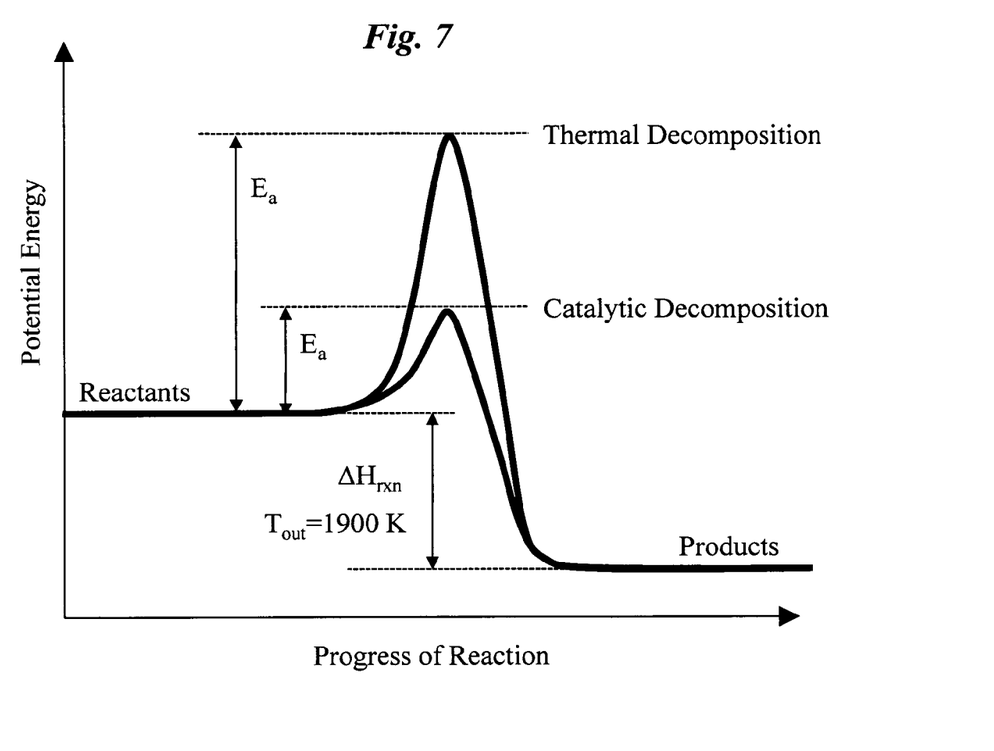
FIG. 7 is a graph of energy vs. reaction progress for the decomposition reaction $N_2O \rightarrow \frac{1}{2}O_2 + N_2 + 82$ kJ, contrasting the thermal dissociation with the catalytic dissociation as employed in an embodiment of the present invention.

The global decomposition reaction for $N_2O$ is exothermic. The energy diagram for the reaction $N_2O \rightarrow \frac{1}{2}O_2 + N_2 + 82$ kJ is shown in FIG. 7. This decomposition reaction reaches appreciable rates at temperatures over 850° C. and is initiated by an activation energy of approximately 250 kJ/mol. However, this activation energy can be significantly reduced in the presence of a metal catalyst such as rhodium and/or very lean concentrations of methane. It should be noted that small amounts of hydrocarbon or hydrogen in $N_2O$ can greatly increase the rate of decomposition. A properly designed and well-characterized system can safely operate with very lean amounts of methane. Furthermore, the presence of very lean methane concentrations significantly increases the kinetics of $N_2O$ decomposition.

Figure 8:
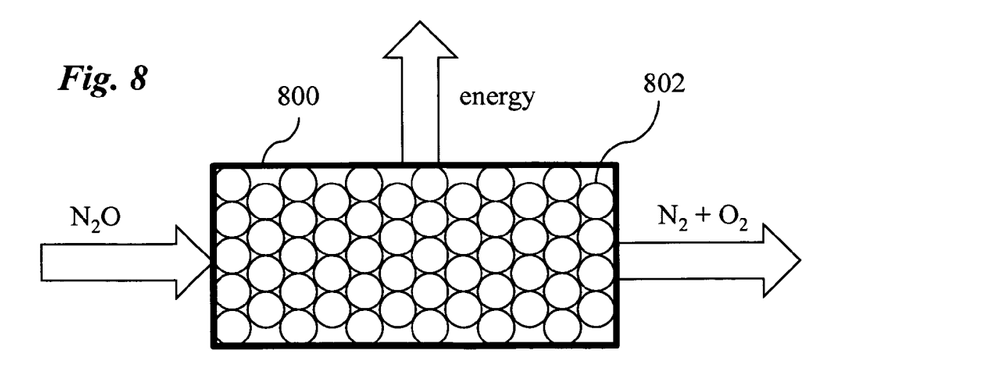
FIG. 8 is a schematic diagram of a hardware reactor device for performing catalytic decomposition of the nitrous oxide according to an embodiment of the invention.

In case the decomposition of the nitrous oxide is performed catalytically, the decomposition may be performed as shown in FIG. 8 by flowing a gas stream containing a suitably high concentration of gaseous nitrous oxide through a chamber 800 containing a catalyst 802, e.g., deposited on spherical particles made of a catalyst support. Once the reaction is started, the energy released is used to keep the catalyst material hot to sustain the reaction. Excess energy may be extracted as heat for power generation, e.g., using a Sterling cycle heat engine. If the concentration of the nitrogen is not sufficiently high, however, the catalyst material may need to be heated externally to sustain the decomposition reaction. An $N_2O$ decomposition device appropriate for use in embodiments of the present invention is preferably capable of sustaining stable and continuous operation in a hot oxidizing environment while minimizing thermal degradation of housing walls. The chamber 700 may be made of a high-temperature ceramic or high-temperature alloy. The catalyst 702 may be a metal or metal oxide, such as a transition metal or transition metal oxide. Catalysts include rhodium, rhodium oxide, iron, or iron oxide. Catalyst supports may include gamma phase aluminum oxide, zeolites, or a high surface area ceramic. Some embodiments of the hardware reactor device may include a built-in ceramic glow plug for preheating the catalyst bed, a Hastelloy-X chamber for high temperature oxidation resistance, and a ceramic yttria-stabilized zirconia aft catalyst bed support. Embodiments may employ high temperature resistant refractory ceramics, such as ceramic matrix composite (CMC) aluminum oxide, that ensure long operational lifetimes with minimal structural degradation. Very lean concentrations of methane may be introduced into the decomposition chamber to increase the decomposition kinetics of $N_2O$ and help maintain decomposition at very low flow rates. Thermal insulation of the device chamber, e.g., with aluminum oxide layers, may be used to minimize decomposition heat loss. Multiple nano-layered coatings may be used to further reduce the thermal conductivity of the insulating material.

Combustion with Nitrous Oxide Gas as Oxidant or Co-Oxidant

In some embodiments of the invention, rather than decomposing the nitrous oxide in the hardware reactor device, it may be used instead as an oxidant or co-oxidant in a combustion reaction, e.g., in the combustion of methane.

Advantages, Wastewater Treatment Example

Embodiments of the invention have numerous advantages over prior methods.

1. This technology could triple the amount of methane that can be recovered at a treatment plant. For municipal sewage, this could be up to about 0.1 L of methane gas per liter of wastewater treated. In contrast to the conventional method of nitrogen removal which uses waste organics for reducing power, the present technology uses ammonia instead of organic matter. Consequently, much more organic matter is available for methane production.

2. The amount of $O_2$ used for nitrification is 60% less that than required by conventional methods. This reduction is significant because aeration is about 50% of the operational costs of a treatment plant.

3. Waste biomass is significantly decreased because heterotrophic denitrification, a process that produces considerable biomass, is no longer necessary. Disposal of waste biomass is the second greatest operational expense at treatment plants.

4. A well-known anaerobic ammonia oxidation technology recently developed at Delft University relies upon anammox bacteria. These are very slow-growing bacteria, and as a result, the reactors are slow to start up, and slow to fix when upset. The organisms used in the present technology, in contrast, are more robust and have shorter doubling times.

5. The small size of the nitrous decomposition reactors is well-suited for compact distributed operation of wastewater systems.

6. Emissions of greenhouse gas $N_2O$ are eliminated through a process that creates an economic incentive for $N_2O$ production and capture—like processes for production and capture of the greenhouse gas methane.

Embodiments of the invention have the potential to dramatically change domestic and to industrial wastewater treatment and nitrogen management in landfill leachates. In addition, they can also impact biomass production of biodiesel, ethanol, and other fuels. In these processes, fuels must be separated from nitrogen-containing biomass, which then becomes waste. Conversion of the waste nitrogen to nitrous oxide enables power production, avoids greenhouse gas emissions, and prevents discharge of other harmful forms of nitrogen.

To illustrate the advantages, consider the Palo Alto Water Quality Control Plant as an example of the potential energy benefits to implementing this technology. An estimated 2000 kg of $N_2O$ could potentially be produced per day by this plant if the treatment plant bioreactors were operated so as to maximize $N_2O$ production. This rate of production (23 grams/sec) of $N_2O$ would generate 43 kW. To put this in perspective, an average home consumes approximately 7 kW-hr per day. Assuming an energy conversion efficiency of 30%, the 43 kW generated by the decomposition of $N_2O$ could power approximately 40 homes. The reactor needed to accomplish this rate of decomposition would only be three to four times the size of the ones developed to date. This translates into even bigger energy generation in wastewater treatment plants such as San Jose where it is estimated that $N_2O$ production via microbial processes could be 10 times greater than that of Palo Alto. The above energy benefits only address the energy available in the nitrogen. Additional energy benefits would derive from the fact that this process, if coupled to methane fermentation for carbon removal, could avoid use of organic matter as a supply of reducing power, thereby allowing increased production of methane. For typical sewage, three times more methane could potentially be generated compared to the conventional wastewater treatment process. Nor does the above energy analysis include the benefit resulting from a significant reduction in oxygen from coupled methane fermentation for carbon removal and $N_2O$ production/decomposition for nitrogen removal. Carried out on a large scale, this technology can be a significant source of renewable energy.

The invention claimed is:

1. A method for wastewater treatment and energy production wherein nitrogen is removed from wastewater and converted to nitrous oxide and wherein energy is produced from the nitrous oxide, the method comprising:
pumping the wastewater into a bioreactor system, wherein the wastewater comprises ammonia;
processing the ammonia in the bioreactor system to produce a nitrous oxide product, with nitrite as an intermediate product, wherein the bioreactor is operated to enhance production of nitrous oxide;
feeding the nitrous oxide product of the bioreactor system to a hardware reactor device coupled to the bioreactor system;
and
chemically reacting the nitrous oxide in gas phase in the hardware reactor device to produce energy obtained from the nitrous oxide product of the bioreactor system, whereby energy is produced from the nitrogen removed from the wastewater.

2. The method of claim 1 further comprising separating a portion of the nitrous oxide that is dissolved in aqueous effluent to increase an amount of gas phase of the nitrous oxide product.

3. The method of claim 2 further comprising concentrating an amount of the nitrous oxide in a gas stream, and feeding the concentrated nitrous oxide gas stream to the reactor device.

4. The method of claim 1 wherein the wastewater comprises organic nitrogen compounds or reactive nitrogen compounds.

5. The method of claim 1 further comprising obtaining the wastewater from wastewater processing, landfill leachates processing, agricultural waste processing, fertilized agricultural soil processing, biomass production of hydrocarbon fuels, biomass production of diesel fuel, or biomass production of ethanol.

6. The method of claim 1 wherein the processing comprises producing nitrous oxide as an end point of denitrification.

7. The method of claim 1 wherein the processing comprises utilizing communities of autotrophic microorganisms, communities of autotrophic microorganisms capable of nitrifier denitrification, communities of ammonia oxidizing bacteria, communities of ammonia oxidizing archaea, or communities of heterotrophic denitrifying microorganisms.

8. The method of claim 1 wherein the processing in the bioreactor system has multiple reaction stages.

9. The method of claim 8 wherein a first stage of the processing in the bioreactor system is aerobic and a second stage of the processing in the bioreactor system is anoxic.

10. The method of claim 9 wherein the second stage of the processing in the bioreactor system is aerated to a dissolved oxygen level below 20% oxygen saturation.

11. The method of claim 9 wherein the second stage of the processing in the bioreactor system is aerated to a dissolved oxygen level below 3% oxygen saturation.

12. The method of claim 9 wherein the second stage of the processing in the bioreactor system is anaerobic.

13. The method of claim 1 wherein the processing in the bioreactor system comprises performing nitrification and partial denitrification.

14. The method of claim 1 wherein the processing in the bioreactor system comprises performing nitrifier denitrification.

15. The method of claim 1 wherein chemically reacting the nitrous oxide comprises catalytically decomposing the nitrous oxide to produce oxygen gas and nitrogen gas.

16. The method of claim 15 further comprising recycling the oxygen gas product from the nitrous oxide reaction to the bioreactor system.

17. The method of claim 15 wherein the decomposition of the nitrous oxide is performed catalytically using a transition metal or transition metal oxide catalyst.

18. The method of claim 15 wherein the decomposition of the nitrous oxide is performed by flowing through a chamber a gas stream containing the nitrous oxide, wherein the chamber contains a catalyst.

19. The method of claim 1 wherein chemically reacting the nitrous oxide comprises thermally decomposing the nitrous oxide by external heating, decomposing the nitrous oxide through exothermic decomposition, using the nitrous oxide as an oxidant in a combustion reaction, or using the nitrous oxide as co-oxidant in a combustion reaction.

20. A method for wastewater treatment and energy production wherein nitrogen is removed from wastewater and converted to nitrous oxide and wherein energy is produced from the nitrous oxide, the method comprising:
pumping the wastewater into a bioreactor system, wherein the wastewater comprises ammonia;
processing the ammonia in the bioreactor system to produce a nitrous oxide product, with nitrite as an intermediate product, wherein the bioreactor is operated to enhance production of nitrous oxide, wherein a majority of processed ammonia nitrogen is converted to nitrous oxide nitrogen;
feeding the nitrous oxide product of the bioreactor system to a hardware reactor device coupled to the bioreactor system; and
chemically reacting the nitrous oxide in gas phase in the hardware reactor device to produce energy obtained from the nitrous oxide product of the bioreactor system, whereby energy is produced from the nitrogen removed from the wastewater.

* * * * *